July 12, 1960

W. B. POLK 2,945,077

PROCESS AND APPARATUS FOR PRESSURE AND
TEMPERATURE CONTROL SYSTEM

Filed Dec. 1, 1955

INVENTOR.
W. B. POLK

BY

*Hudson and Young*

ATTORNEYS

United States Patent Office 2,945,077
Patented July 12, 1960

2,945,077

PROCESS AND APPARATUS FOR PRESSURE AND TEMPERATURE CONTROL SYSTEM

Walter B. Polk, Borger, Tex., assignor to Phillips Petroleum Company, a corporation of Delaware Filed Dec. 1, 1955, Ser. No. 550,269

9 Claims. (Cl. 260—683.3)

This invention relates to a system for controlling temperature and pressure in a catalytic conversion system.

In many catalytic conversion processes rapid and/or extreme temperature changes are encountered at some point in a conversion-regeneration cycle of operation. Proper control of reaction conditions may require very rapid heating or cooling of catalyst; and as this is difficult when solid catalyst material is arranged in beds it has become customary to carry out such reactions by passing reactants into contact with solid catalyst material contained in tubes, over which heating or cooling fluid can be made to flow.

It is often desirable to control the temperature of catalytic reactions within very narrow limits. Rapid and extreme temperature changes may also be necessary at some point in the cycle of operations. One form of apparatus employed for carrying out reactions of the type described comprises a heat insulated case or housing having a plurality of catalyst tubes arranged therein. Hot combustion gases from a furnace or oven are passed into said case, circulated therein, and removed through an exhaust outlet. Said apparatus is adapted to maintain substantially even temperatures over a wide range of operating conditions and to permit rapid and extreme changes in temperatures between processing conditions and regeneration conditions. By employing circulation of hot combustion gases as described, it is possible to approximate isothermal reaction conditions within said catalyst tubes.

The rapid and extreme changes in temperature between the processing portion and the regeneration portion of the cycle of the operation causes wide fluctuations in the amount of fuel gas burned in the oven or furnace employed to supply the circulated combustion gases. In the operation of said furnace or oven, it is customary to use large quantities of excess air. However, the amount of excess air must be controlled because: too much excess air decreases the efficiency of the process due to the fact that this excess air must be heated; and too little excess air can result in overheating of the refractory walls of the furnace during periods of high temperature operation, i.e., during the processing cycle. Due to said wide fluctuation in fuel requirements it has been found undesirable to maintain a set ratio between excess air and fuel burned. In the past, it has been more practical, and customary, to adjust the excess air ratio on the basis of the amount of fuel burned under average operating conditions of the process cycle; the amount of said fuel burned being regulated so as to maintain a predetermined temperature within the said insulated case or housing. As a result of setting the excess air ratio for average operating conditions in the process cycle, there are periods when too much excess air is employed, resulting in decreased efficiency, and there are periods when there is insufficient excess air, causing overheating of the refractory in the furnace. This overheating sometimes results in failure of the refractory, necessitating expensive shutdowns for the replacement of said refractory. It is highly desirable that such overheating be avoided.

Herein and in the claims, unless otherwise specified, the terms "catalyst case" and "conversion zone" are employed generically to refer to a heat insulated case or housing having catalyst tubes filled with catalyst arranged therein.

I have discovered that the temperature of the refractory of the furnace can be easily and effectively controlled by installing temperature sensing means in said refractory, and controlling the pressure in the catalyst case, and furnace, responsive to the temperature of said refractory. When the pressure in said case, and furnace, is increased, less excess air is drawn into said furnace and less fuel for heating purposes is required because there is less air to be heated to the required temperature. When the pressure in said case, and furnace, is decreased, more excess air will be drawn into said furnace, thus removing heat therefrom, and lowering the temperature of the refractory walls. Of course, sufficient fuel is burned in the furnace at all times to maintain the desired temperature within the catalyst case. Thus, broadly speaking, my invention comprises controlling the amount of fuel burned in the furnace responsive to the temperature within the catalyst case and controlling the removal of combustion gases from said catalyst case responsive to the temperature of a wall of said furnace.

An object of this invention is to provide improved heat distribution in a hydrocarbon conversion system. Another object of the invention is to provide an improved method for controlling heat distribution within a hydrocarbon conversion system. Another object of the invention is to provide an improved combination of apparatus for controlling the distribution of heat within a hydrocarbon conversion system. Another object of the invention is to provide a method for protecting the refractory wall or walls of a furnace, employed to supply combustion gases to a catalyst case, from excessive radiant heat. Another object of the invention is to decrease the amount of fuel required to maintain reaction conditions in a hydrocarbon conversion system. Still another object of the invention is to increase the activity of the catalyst in a hydrocarbon conversion system wherein combustion gases are circulated within a conversion zone around catalyst beds, maintained in tubes, to approximate isothermal reaction conditions. Other aspects, objects, and advantages of the invention will be apparent to those skilled in the art upon reading this disclosure.

Thus according to the invention, there is provided a method for controlling the distribution of heat within a hydrocarbon conversion system wherein hot combustion gases from a combustion zone are circulated within a conversion zone and withdrawn from said conversion zone, and also protecting the wall or walls of said combustion zone from being overheated, which method comprises: controlling the amount of fuel burned in said combustion zone responsive to the temperature within said conversion zone; and controlling the withdrawal of said combustion gases from said conversion zone responsive to the temperature of a wall of said combustion zone.

Further according to the invention, there is provided an improved combination of apparatus for carrying out the method of the invention.

It is to be noted that the pressure within the conversion zone is controlled responsive to a wall temperature in the combustion zone; and further, that said pressure control is effected by controlling the amount of the combustion gases withdrawn from the conversion zone. Thus, at a preselected temperature, a temperature actuated pressure regulator, responsive to the temperature of a refractory wall in the furnace, reduces the pressure within the conversion zone. When the refractory temperature decreases below a preselected temperature the pressure within the conversion zone is increased again. By thus controlling the pressure within the conversion zone, and within the furnace, substantial savings in the amount of fuel required to maintain the desired heat in the catalyst case are effected.

Another important advantage of the invention is the marked increase in catalyst activity. Increased pressure in the catalyst case results in better heat distribution therein and thereby decreases the decline in catalyst activity. As will be explained further hereinafter, the better heat distribution within the catalyst case results from a greater flow of the combustion gases across the bottom portion of the catalyst tubes, and a higher density of the circulated combustion gases due to the higher content of carbon dioxide and water vapors in said gases. Said higher density results in more pounds of gas being circulated for the same volume of gas.

Figure 1:
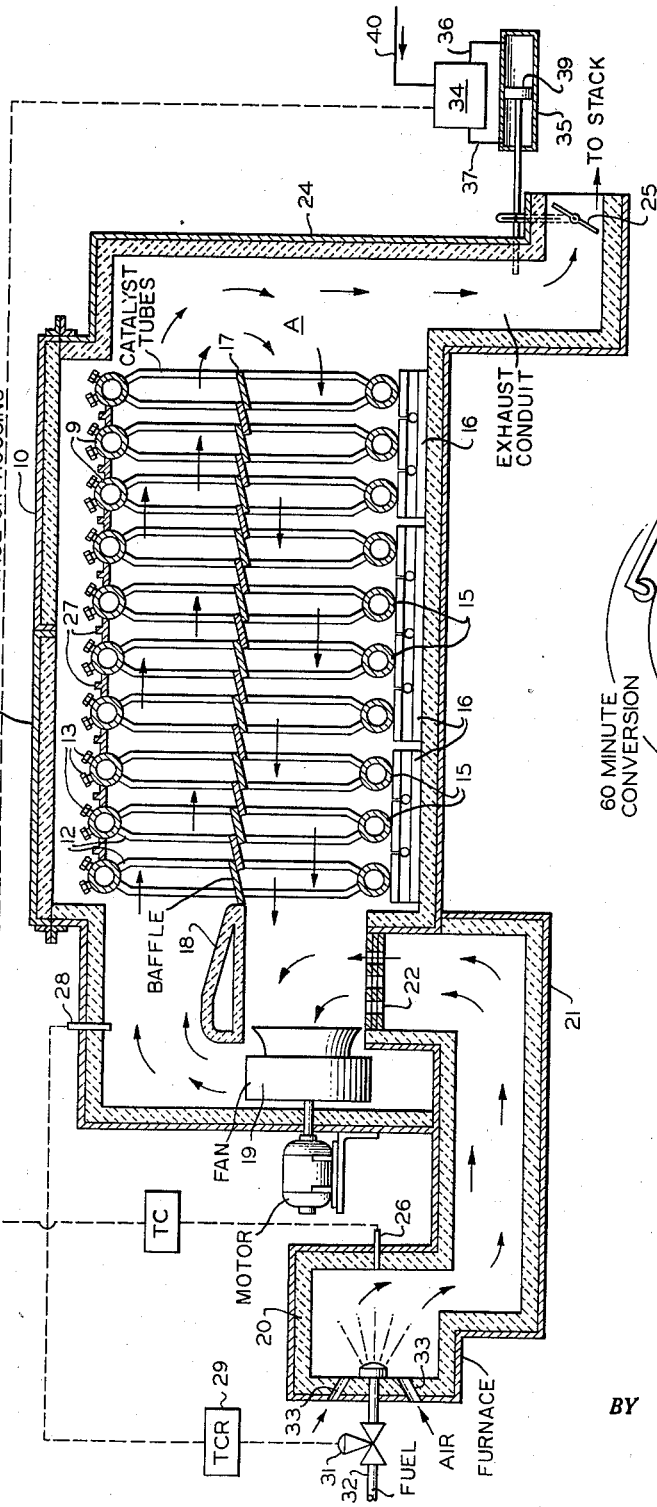
Figure 1 is a vertical section through a catalyst case and furnace assembly and illustrates the cooperation between the control elements of the invention.

Referring now to the drawings the invention will be more fully explained. The invention will be described with particular reference to a catalyst case apparatus, and a process, which has been found to be especially effective for the catalytic dehydrogenation of normal butane to butenes, and for the dehydrogenation of butenes to butadiene. However, while the invention is described with particular reference to said apparatus and said processes, it is not to be limited thereto. The invention is applicable to any process wherein heated gases from a combustion zone are circulated in a conversion zone. In Figure 1, there is shown a catalyst case or insulated housing 10, having a top and sides constructed in demountable sections. Catalyst tubes 12 are connected to inlet cross headers 9. Said cross headers 9 are connected at one end to a main inlet header (not shown) positioned outside case 10. Openings in inlet cross headers 9 are closed by removable plugs 13. Said openings are disposed diametrically across said inlet headers from catalyst tubes 12 and serve the purpose of admitting catalyst into said tubes. Outlet cross headers 15 extend across the insulated housing and outside the same where they are each connected at one end to a main outlet header (not shown). Said catalyst tubes 12 are connected at their lower ends into said outlet cross headers. Said outlet cross headers rest slidably upon supporting rails 16 disposed in the bottom of the case or housing. A flexible baffle member 17 extends across the housing in a plane intersecting the tubes 12. A flow directing member 18 is attached to the end of said baffle member nearest fan 19. A source of heated gases 20 is disposed outside said housing, is connected to said housing and communicates therewith via a conduit 21 and jetting means 22. Said source of heated gases is shown here as comprising a Dutch oven. However, other sources of heated gases such as the various kinds of furnaces can be employed. Jetting means 22 is located upstream of the fan 19 and downstream of catalyst tubes 12 in the continuous path of circulating gases within said housing 10. From the circulating space in housing 10 at the end thereof opposite said fan 19, an exhaust conduit 24 extends to a stack or other means (not shown) for disposing of waste gases. A damper or other means 25 for controlling the amount of gas passing through conduit 24 is disposed in said conduit. Further details regarding the catalyst case assembly per se can be found in U.S. Patent No. 2,666,692.

A thermocouple 26 is positioned in a wall of furnace or oven 20 and serves as a temperature sensing means for measuring the temperature of the refractory lining of said wall. While said thermocouple 26 is illustrated as being positioned in the back wall of said furnace or oven 20 it can be placed in any wall of said furnace or oven or for that matter, in a wall of conduit 21. Furnace 20 and conduit 21 in operation comprise a combustion zone. Therefore, herein and in the claims, unless otherwise specified, the term "a wall" includes any wall of furnace 20 or conduit 21; and the term "combustion zone" includes both furnace 20 and conduit 21. Thermocouple 26 is connected to temperature controller 27. Temperature controller 27 actuates positioner 34. Said positioner 34, depending upon the signal received from controller 27, admits compressed air from line 40 (90–100 p.s.i.g.) into air cylinder 35 through either line 36 or 37, and thus causes movement of piston 39 in cylinder 35. The shaft of piston 39 is operatively connected to the shaft of damper 25. All of the instruments 27, 34, and 35 are conventional instruments commercially available from several instrument companies. In the specific apparatus here illustrated controller 27 was a Brown instrument, available from the Minneapolis-Honeywell Co., Philadelphia, Pa.; positioner 34 was a Foxboro Poweractor positioner; and air cylinder 35 was a Forboro Stabiload air cylinder. The latter two instruments are available from The Foxboro Co., Foxboro, Mass. The construction and operation of such instruments is well known to those skilled in the art.

A thermocouple 28 is positioned within catalyst case 10 and is connected to temperature controller recorder 29, which is operatively connected to motor valve 31 in line 32. Ports 33 are for the admission of air to furnace 20.

Figure 2:
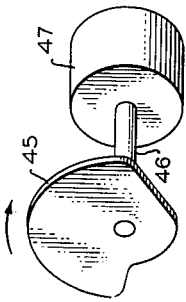
Figure 2 is an illustration of the cam mechanism employed in the temperature controller recorder of Figure 1.

Figure 2 illustrates the basic control elements of recorder controller 29. These consists of a cam 45 mounted on a rotating shaft 46 and driven from member 47 which in turn is driven by an electric motor not shown. Cam 45, by means of the cam follower shown in Figure 3, serves to "reset" the air flow controlling the position of motor valve 31. Said air flow is reset whenever the radius of curvature of the cam changes. Each position of cam 45 "calls for" a certain temperature to be maintained in catalyst case 10, thus, there is a definite range of control valve positions for each position of the cam. For example, if it is desired to maintain a temperature of 1000 degrees within catalyst case 10, the cam 45 will maintain said temperature during its selected control position. The various ranges of control positions of the valve 31 responsive to the varying cam radii can be set manually after observing the temperature registered with the various positions of the cam. In this way the position of cam 45 regulates the gas flow through valve 31. Temperature controller recorder 29 is a conventional instrument available from the Bristol Company, Waterbury, Conn.

Figure 3:
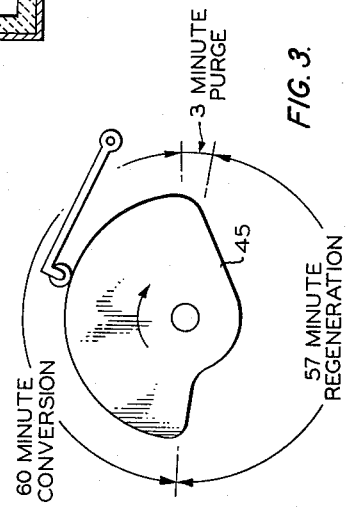
Figure 3 illustrates the cycle of operations in the reference process employed to illustrate the invention.

Figure 3 illustrates diagrammatically the time cycle through which cam 45 operates. The cam is designed to control the operation of valve 31 in two hour units of time. This time is shown as divided into three intervals, i.e., 60 minutes, 57 minutes, and 3 minutes. The 60 minute interval is the dehydrogenation or processing portion of the cycle which, being endothermic, requires that valve 31 can be, if necessary, wide open so as to supply maximum fuel. The fifty-seven minute interval is the catalyst regeneration portion of the cycle, which portion is the exothermic portion of the cycle wherein fuel gas injection is at a minimum. The three minute interval is at the end of the regeneration portion of the cycle, and during this interval the pressure on the catalyst cases is reduced by "bleeding" off regeneration gases preparatory to resuming the processing portion of the cycle. During about the final 15 minutes of the regeneration heat is gradually added to the case so that the temperature within the catalyst tubes is returned to reaction temperature so as to affect dehydrogenation as soon as hydrocarbon is switched into the catalyst tubes at the start of the succeeding process portion of the cycle.

In a typical example the entire cycle of dehydrogenation and regeneration covers two hours, one hour for the processing portion, and one hour for the regeneration portion, plus purging. During the regeneration portion of the cycle carbon and carbonaceous deposits, laid down on the catalyst during the processing portion of the cycle, are burned from the catalyst using regeneration gases containing from 2-3 percent oxygen.

In a typical operation for the dehydrogenation of butane to butene, butane in vapor phase, preheated to a temperature within the range of 900-1300° F., preferably 1000-1200° F., is passed over a suitable catalyst in catalyst tubes 12. Said butane is passed over said catalyst at a space velocity within the range of 700-1300 volumes per volume of catalyst per hour, preferably 750-760 volumes per volume of catalyst per hour. The pressure within catalyst tubes 12 maintained within the range of 0-20 pounds per square inch gauge, preferably within the range of 7-12 pounds per square inch gauge. Reaction effluent is withdrawn through outlet headers 15 and passed through a conduit header not shown to fractionation means wherein the products of the reaction are separated.

Obviously the specific temperatures, pressures, and space velocities employed in catalyst tubes 12 will depend upon the specific catalyst employed. Any suitable catalyst for the dehydrogenation of butane to butene can be employed and the invention is not to be limited to any particular catalyst. However, a presently preferred catalyst for the dehydrogenation of butane to butene is one comprising approximately 20% chromium oxide and 80% aluminum oxide. Further details regarding this catalyst can be found in U.S. Patent 2,606,159. As stated previously the particular apparatus and process here used to illustrate the invention can be employed to dehydrogenate butene to butadiene. A presently preferred catalyst for this latter operation is one comprising about 62.4% ferric oxide, about 35.2% potassium carbonate, and about 2.4% chromium oxide. Again, other catalysts can be employed for the dehydrogenation of butene to butadiene.

In the operation of the catalyst case assembly illustrated in Figure 1, the pressure within housing 10 in the region between member 18 and jetting means 22 is generally maintained at slightly below atmospheric. The pressure in the region A (which can be considered the back end of the housing) is usually maintained within the range of 0.6 to 1.4 inches of water, depending upon the position of damper 25. Thus, conditions are maintained for the circulation of hot combustion gases from furnace 20 by means of fan 19 across the upper portion of catalyst tubes 12 above baffle means 17 and back across the lower portion of catalyst tubes 12 under baffle means 17 to the inlet of fan 19. When damper 25 is wide open approximately one-third of the circulating gases entering region A are passed out through exhaust conduit 24 and the remaining two-thirds are returned to fan 19. Such conditions are conducive to the entrance of the maximum amount of excess air through ports 33 into furnace 20 because, as previously stated, the pressure above jetting means 22 is slightly below atmospheric pressure.

In the practice of the invention, the increase of the pressure within catalyst case 10 by controlling the position of damper 25, reduces the amount of gas withdrawn through exhaust conduit 24 and more gas is returned to fan 19 across the lower portion of catalyst tubes 12. The increased pressure in catalyst case 10 also results in less excess air being drawn into furnace 20 through ports 33. Consequently, the gases circulating within the catalyst case 10 have a higher density and better heat distribution is obtained in said catalyst case.

EXAMPLE

Table I given below summarizes the results of a number of runs carried out for the dehydrogenation of butane to butenes employing a 20 percent chromium oxide-80 percent aluminum oxide catalyst. During a portion of each run damper 25 was on control and the position thereof was controlled responsive to the temperature registered by thermocouple 26. During the other portion of each run said damper 25 was not controlled and was in an open position. All figures given are average figures obtained by averaging a number of determinations and readings during the said periods of "damper on control" and "damper open."

Table I

|  | Run No. 1 | | Run No. 2 | | Run No. 3 | | Run No. 4 | |
| --- | --- | --- | --- | --- | --- | --- | --- | --- |
|  | Damper on Control | Damper Open | Damper on Control | Damper Open | Damper on Control | Damper Open | Damper on Control | Damper Open |
| Feed Rate, M s.c.f.h.[1] | 67 | 67 | 77 | 77 | 77 | 76 | 73 | 73 |
| Fuel Consumption, c.f.h.[2] | 7,460 | 12,200 | 7,910 | 13,100 | 8,635 | 12,900 | 9,200 | 13,000 |
| Preheater Outlet Temp., °F | 1,050 | 1,050 | 1,075 | 1,070 | 1,075 | 1,075 | 1,100 | 1,100 |
| Case Temperature, °F | 1,147 | 1,148 | 1,195 | 1,200 | 1,210 | 1,215 | 1,213 | 1,211 |
| Hydrocarbon Effluent Analyses: | | | | | | | | |
| Conversion, Mol. Percent | 29.4 | 29.7 | 30.7 | 30.7 | 31.3 | 31.3 | 32.7 | 31.3 |
| Selectivity, Mol. Percent | 91.7 | 90.7 | 89.4 | 88.4 | 88.0 | 86.7 | 86.9 | 85.4 |
| Yield, Mol. Percent | 27.0 | 26.9 | 27.4 | 27.1 | 27.5 | 27.1 | 28.4 | 26.7 |
| Carbon, Wt. Percent | 0.1 | 0.2 | 0.3 | 0.3 | 0.3 | 0.4 | 0.5 | 0.6 |
| CSV [3] | 121.1 | 120.4 | 120.1 | 119.1 | 119.3 | 118.0 | 119.6 | 116.7 |
| Catalyst Age, days | 16 | | 39 | | 52 | | 87 | |
| Fuel Saved, Damper on Control, c.f.h. | 4,740 | | 5,190 | | 4,265 | | 3,800 | |
| Fuel Saved, Damper on Control, Percent | 38.8 | | 39.6 | | 33.1 | | 29.2 | |

[1] Thousand standard cu. ft. per hour.
[2] Cubic feet per hour.
[3] Sum of conversion and selectivity values. This value is used as an indication of catalyst efficiency. A higher value indicates higher efficiency.

In the above Table I particular attention is called to amount of fuel saved during the period when the damper was "on control." These figures are substantial and in a large plant where a great number of catalyst cases are employed, the savings in fuel costs alone will amount to well over a hundred thousand dollars per year. In these days of steadily increasing fuel costs, the value of the invention will be readily appreciated by those skilled in the art.

Even more important than the savings in fuel cost is the increase in catalyst efficiency. It is to be noted that both conversion and selectivity were increased when the damper was "on control." The increase is more pronounced as the catalyst increases in age. The savings in catalyst costs will be even greater than the savings in fuel cost.

Various modifications of the invention can be made in view of the above disclosure and discussion without departing from the spirit or scope of the invention.

I claim:

1. In a hydrocarbon conversion system wherein the catalyst within a conversion zone is alternately on process and on regeneration and wherein hot combustion gases from a combustion zone are passed to said conversion zone, circulated in a cycle within said conversion zone around a first end portion and then around the other end portion of a catalyst bed therein, and withdrawn from said conversion zone, and wherein it is desired to protect the walls of said combustion zone from excessive temperatures, the improvement which comprises: controlling the amount of fuel burned in said combustion zone responsive to the temperature within said conversion zone; and separately controlling the withdrawal of said gases from said conversion zone responsive to the temperature of a wall of said combustion zone by withdrawing more of said gases from said conversion zone and admitting more excess air into said combustion zone when said wall temperature increases and withdrawing less of said gases from said conversion zone and admitting less excess air into said combustion zone when said wall temperature decreases.

2. In a hydrocarbon conversion system wherein the catalyst within a conversion zone is alternately on process and on regeneration and wherein hot combustion gases from a combustion zone are passed to said conversion zone, circulated in a cycle within said conversion zone around a first end portion and then around the other end portion at a catalyst bed therein, and withdrawn from said conversion zone, and wherein it is desired to protect the walls of said combustion zone from excessive temperatures, the improvement which comprises: controlling the amount of fuel burned in said combustion zone responsive to the temperature within said conversion zone; and separately controlling the pressure within said conversion zone responsive to the temperature of a wall of said combustion zone by withdrawing more of said gases from said conversion zone and admitting more excess air into said combustion zone when said wall temperature increases and withdrawing less of said gases from said conversion zone and admitting less excess air into said combustion zone when said wall temperature decreases.

3. A method for controlling the distribution of heat in a hydrocarbon conversion system wherein the catalyst within a conversion zone is alternately on process and on regeneration and wherein hot combustion gases from a combustion zone are passed to said conversion zone, circulated in a cycle within said conversion zone around a plurality of catalyst beds arranged therein, said circulation being around a first end portion and then around the other end portion of all of said catalyst beds, and a portion of said circulating gases is withdrawn from said conversion zone after passing around said first end portion of all of said catalyst beds, which method comprises: controlling the amount of fuel burned in said combustion zone responsive to the temperature within said conversion zone; and separately controlling the withdrawal of said gases from said conversion zone responsive to the temperature of a wall of said combustion zone by withdrawing more of said gases from said conversion zone and admitting more excess air into said combustion zone when said wall temperature increases and withdrawing less of said gases from said conversion zone and admitting less excess air into said combustion zone when said wall temperature decreases.

4. In a hydrocarbon conversion system wherein a plurality of catalyst tubes containing catalyst are disposed within a catalyst case and hot combustion gases from a combustion zone are circulated in a cycle around said catalyst tubes, said circulation being around a first end portion and then around the other end portion of all of said catalyst tubes, a portion of said combustion gases being withdrawn from said case during said cycle, the method of controlling the temperature within said case and also protecting the walls of said combustion zone from excessive temperatures, which method comprises: controlling the amount of fuel burned in said furnace responsive to the temperature within said case; and separately controlling the amount of said combustion gases withdrawn from said case responsive to the temperature within said combustion zone by withdrawing more of said gases from said case and admitting more excess air into said combustion zone when said combustion zone temperature increases and withdrawing less of said gases from said case and admitting less excess air into said combustion zone when said combustion zone temperature decreases.

5. In a hydrocarbon conversion system wherein the catalyst within a catalyst container disposed within a housing is alternately on process and on regeneration, and wherein hot combustion gases from a combustion zone are circulated in a cycle within said housing around a first end portion and then around the other end portion of said catalyst container and withdrawn from said housing, and wherein it is desired to control the temperature within said housing and also to protect the walls of said combustion zone from excessive temperatures, the method which comprises: controlling the amount of fuel burned in said combustion zone responsive to the temperature within said housing; and separately controlling the withdrawal of said gases from said housing responsive to the temperature within said combustion zone by withdrawing more of said gases from said housing and admitting more excess air into said combustion zone when said combustion zone temperature increases and withdrawing less of said gases from said housing and admitting less excess air into said combustion zone when said combustion zone temperature decreases.

6. A method for controlling the heat distribution in a catalyst case which contains catalyst tubes filled with catalyst and wherein hot flue gases from a furnace are circulated in a cycle within said case around a first end portion of all of said catalyst tubes and then around the other end portion of all of said catalyst tubes, a portion of said circulating gases being withdrawn from said case after passing around said first end portion of said catalyst tubes; which method comprises: controlling the amount of fuel burned in said furnace responsive to the temperature within said case; and separately controlling the amount of gases withdrawn from said case responsive to a wall temperature within said furnace by withdrawing more of said gases from said case and admitting more excess air into said furnace when said wall temperature increases and withdrawing less of said gases from said case and admitting less excess air into said furnace when said wall temperature decreases.

7. Apparatus for carrying out chemical reactions which comprises, in combination: a housing; a catalyst tube positioned within said housing; a furnace communicating with one end of said housing for supplying hot combustion gases to said housing; means within said housing for circulating said combustion gases in a cycle around a first end portion and then around a second end portion of said catalyst tube; an exhaust conduit at the opposite end of said housing; flow control means in said exhaust conduit; fuel inlet means for supplying fuel to said furnace; air inlet means for supplying combustion air and excess air to said furnace; a first temperature sensing means within said housing; temperature control means connected to said first temperature sensing means and operatively connected to said fuel inlet means for controlling the amount of fuel supplied to said furnace responsive to the temperature within said housing; a second temperature sensing means positioned in a wall of said furnace; pressure controlling means connected to said second temperature sensing means and operatively connected to said flow control means in said exhaust conduit for controlling the amount of said combustion gases withdrawn from said housing responsive to the temperature of said wall of said furnace by withdrawing more of said gases from said housing and admitting more excess air into said furnace when said wall temperature increases and withdrawing less of said gases from said housing and admitting less excess air into said furnace when wall temperature decreases.

8. Apparatus for carrying out chemical reactions, which comprises, in combination: a series of parallel vertically disposed harps each comprising, an upper horizontal header, a lower horizontal header parallel to said upper header, and a series of spaced-apart catalyst tubes arranged in two parallel rows on opposite sides of a plane passing through the axes of said headers, said tubes being curved at each end so as to offset same from said plane and the ends of said headers extending beyond the outermost tubes on the respective ends a substantial distance so as to provide space for a wall of a hereinafter-named housing between said header ends and said outermost tubes; a heat insulating housing case surrounding said series of harps so as to permit the open ends of said upper headers to extend through one side of said housing and the open ends of said lower headers to extend through the other side of said housing, and so as to provide open space between the ends of said housing and the outermost harp in each instance; a furnace communicating with one end of said housing for supplying hot combustion gases to said housing; an exhaust conduit at the other end of said housing; a damper positioned in said exhaust conduit; a fan and baffle means for circulating said hot combustion gases within said housing around a first end portion and then around a second end portion of all of said catalyst tubes; a fuel inlet having a valve therein for supplying fuel to said furnace; air inlet means for supplying combustion air and excess air to said furnace; a first thermocouple within said housing; a temperature controller connected to said first thermocouple and operatively connected to said valve for controlling the amount of fuel supplied to said furnace responsive to the temperature within said housing; a second thermocouple positioned in a wall of said furnace; a temperature controlled pressure regulator connected to said second thermocouple and operatively connected to said damper in said exhaust conduit for controlling the amount of said combustion gases withdrawn from said housing responsive to the temperature of said wall of said furnace by withdrawing more of said gases from said housing and admitting more excess air into said furnace when said wall temperature increases and withdrawing less of said gases from said housing and admitting less excess air into said furnace when said wall temperature decreases.

9. Apparatus for the conversion of hydrocarbons which comprises, in combination: a catalyst case having a plurality of catalyst containing tubes disposed therein; a furnace communicating with one end of said case for supplying hot combustion gases to said case; means for circulating said combustion gases in said case around a first end portion and then around a second end portion of all of said tubes; an exhaust conduit at the other end of said case for withdrawing combustion gases from said case; flow control means within said exhaust conduit; fuel inlet means for supplying fuel to said furnace; air inlet means for supplying combustion air and excess air to said furnace; and means for controlling the temperature within said case and also protecting the walls of said furnace from excessive temperatures which comprises: a first temperature sensing means within said catalyst case operatively connected to said fuel inlet means in said furnace for controlling the amount of fuel burned in said furnace responsive to the temperature in said case; and a second temperature sensing means positioned within said furnace and operatively connected to said flow control means for controlling the withdrawal of said gases from said case responsive to the temperature within said furnace by withdrawing more of said gases from said case and admitting more excess air into said furnace when said temperature increases and withdrawing less of said gases from said case and admitting less excess air into said furnace when said furnace temperature decreases.

References Cited in the file of this patent

UNITED STATES PATENTS

| | | |
|---|---|---|
| 1,296,250 | Wyss | Mar. 4, 1919 |
| 1,896,910 | Merkt | Feb. 7, 1933 |
| 2,197,175 | Cunningham | Apr. 16, 1940 |
| 2,252,323 | Krogh | Aug. 12, 1941 |
| 2,499,964 | McRae | Mar. 7, 1950 |
| 2,666,692 | Dolezal et al. | Jan. 19, 1954 |

UNITED STATES PATENT OFFICE

CERTIFICATE OF CORRECTION

Patent No. 2,945,077                                      July 12, 1960

Walter B. Polk

It is hereby certified that error appears in the printed specification of the above numbered patent requiring correction and that the said Letters Patent should read as corrected below.

Column 7, line 24, for "portion at" read -- portion of --; column 8, line 62, for "control" read -- controlling --.

Signed and sealed this 4th day of April 1961.

(SEAL)
Attest: ERNEST W. SWIDER

Attesting Officer

ARTHUR W. CROCKER
Acting Commissioner of Patents